United States Patent
Vargantwar

(10) Patent No.: US 9,413,677 B1
(45) Date of Patent: Aug. 9, 2016

(54) DYNAMIC ADJUSTMENT OF REVERSE-LINK RATE-CONTROL PARAMETERS

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1408 days.

(21) Appl. No.: 12/884,453

(22) Filed: Sep. 17, 2010

(51) Int. Cl.
*H04L 7/00* (2006.01)
*H04L 12/911* (2013.01)

(52) U.S. Cl.
CPC ...................................... *H04L 47/70* (2013.01)

(58) Field of Classification Search
None
See application file for complete search history.

(56) References Cited

U.S. PATENT DOCUMENTS

| | | | |
|---|---|---|---|
| 6,078,568 A * | 6/2000 | Wright | H04L 12/5695 370/312 |
| 2005/0088988 A1* | 4/2005 | Kwon et al. | 370/328 |
| 2005/0220116 A1* | 10/2005 | Ahn et al. | 370/395.4 |
| 2008/0004031 A1* | 1/2008 | Rong et al. | 455/452.1 |
| 2009/0103507 A1* | 4/2009 | Gu et al. | 370/342 |

* cited by examiner

*Primary Examiner* — Steve Young

(57) ABSTRACT

A method and system is disclosed for dynamic adjustment of reverse-link rate-control parameters. An access terminal in a wireless communication system that includes a base station will operate in a state in which the access terminal responds to receiving reverse-noise messages from the base station by (i) transmitting data on a reverse-link traffic channel to the base station at a data transmission rate based at least on the received reverse-noise messages and on a level of a resource in reserve for consumption in data transmission, and (ii) when the received reverse-noise messages indicate that conditions for increasing the data transmission rate are satisfied, replenishing the resource by an allocation size specified by at least one parameter. In response to receiving the parameter-adjustment message and while still operating in the state, the access terminal will increase the allocation size by adjusting the at least one parameter, and thereby increase an amount by which the data transmission rate increases.

20 Claims, 7 Drawing Sheets

(a)

302

| CURRENT T2P (x dB) | QRAB | | | | |
|---|---|---|---|---|---|
| | −1 | | | +1 | |
| 11.25 < x | 1 | 0 | 0 | −5 | −6 |
| 8.875 ≤ x < 11.25 | 2 | 1 | 2 | −4 | −5 |
| 4.25 ≤ x < 8.875 | 4 | 3 | 3 | −2 | −4 |
| x < 4.25 | 6 | 4 | 6 | −1 | −2 |
| | −1.0 | −0.5 | 0 | 0.5 | 1.0 |
| | FRAB | | | | |

(b)

304

| CURRENT T2P (x dB) | QRAB | | | | |
|---|---|---|---|---|---|
| | −1 | | | +1 | |
| 11.25 < x | 2 | 1 | 2 | −5 | −6 |
| 8.875 ≤ x < 11.25 | 4 | 2 | 3 | −4 | −5 |
| 4.25 ≤ x < 8.875 | 6 | 4 | 4 | −2 | −4 |
| x < 4.25 | 8 | 6 | 8 | −1 | −2 |
| | −1.0 | −0.5 | 0 | 0.5 | 1.0 |
| | FRAB | | | | |

FIG. 3

DYNAMIC ADJUSTMENT OF REVERSE-LINK RATE-CONTROL PARAMETERS

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

An access terminal may also engage in an active communication session simultaneously with multiple cells or sectors that are located geographically nearby one another, and which are all detected by the AT above one or another threshold signal strength. In this mode of operation, the AT is said to be in "soft handoff" with the multiple sectors, and may move among them seamlessly with respect to the active communication session. As the AT moves beyond the threshold range of one or another of its soft handoff sectors and into the range of one or more other sectors, usual handoff procedures are used to update the particular sectors with which the AT is in soft handoff.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0 and Rev. A, or other version thereof (hereafter "IS-856" unless otherwise specified). Access terminals operating in such systems may be capable of communication with either or both protocols, and may further be capable of handing off between them, in addition to being able to hand off between various configurations of coverage areas.

OVERVIEW

An AT receives data from a base station on a "forward link" and sends data to the base station on a "reverse link." Data on either link are encoded by the sender and decoded by the receiver. The rate at which data can be transmitted on either link depends in part on the RF conditions of the respective link as well as the power level at which the data are transmitted. Better RF conditions and/or higher transmission power (e.g., higher signal-to-noise characteristics of a link) generally supports higher data rates, and vice versa. RF conditions may include factors such as noise and interference, while transmission power level is generally specified in accordance with one or more power-control procedures that are aimed at balancing the transmission power required to accommodate a given data rate with the impact of allocating the requisite power on one or another form of power budget and/or on RF interference.

In one of the power-control procedures used in IS-856 for managing reverse-link noise and load, the base station monitors the aggregate reverse-link noise and interference resulting from the combined transmissions of active ATs in a sector or cell (or other form of coverage area), and periodically broadcasts a reverse-noise message that reflects the aggregate reverse-link noise level measured by the base station. More particularly, the base station periodically sets the reverse-noise message to a binary value (e.g., one or zero) according to whether or not the noise level measured by the base station exceeds a threshold noise level. Upon receiving the message, each AT with an active call or session in the sector may then respond by adjusting its reverse-link power. The manner in which an AT responds depends upon which of version of IS-856 the AT is operating under.

An AT operating under IS-856, Rel. 0 will respond to a reverse-noise message by making an adjustment to its reverse-link data transmission rate according to the binary value in the reverse-noise message. The process of making the adjustment invokes a probability test in order to determine if an adjustment should actually be enacted, while the direction of the adjustment (i.e., upward or downward from a current rate) depends on the binary value in the reverse-noise message. An AT operating instead under IS-856, Rev. A will respond to a reverse-noise message by making an adjustment to variables that control or "tune" characteristic behavior of a reverse-link flow-control mechanism. More specifically, during an active call or session with a sector, the AT periodically computes a time-averaged (or temporally-filtered) measure of the values in received reverse-noise messages from the sector, and adjusts its reverse-link transmission power based in part on the time-averaged measures.

While the procedure under IS-856, Rev. A accounts for some of the dynamic aspects of operating conditions in the sector, such as load and interference, it also depends, in part, on certain fixed parameters that determine one or another characteristic behavior. In particular, the swiftness with which an AT can increase its reverse-link data transmission rate when operating conditions warrant an increase is limited to some extent by fixed operating parameters. Yet, there can be situations in which an AT could increase its reverse-link data transmission rate more quickly or aggressively than the fixed, nominal parameters allow. It would therefore be advantageous to be able to recognize when such situations arise, and responsively to modify the nominal parameters so as to allow for more flexible operation with respect to the rate of adjustment of the AT's reverse-link data transmission rate.

Hence in one respect, various embodiments of the present invention provide, in an access terminal configured to operate in a wireless communication system that includes a base station, a method comprising: operating in a state in which at least: the access terminal responds to receiving reverse-noise messages from the base station by (i) transmitting data on a reverse-link traffic channel to the base station at a data transmission rate based at least on the received reverse-noise messages and on a level of a resource in reserve for consumption in data transmission, and (ii) when the received reverse-noise messages indicate that conditions for increasing the data transmission rate are satisfied, replenishing the resource by an allocation size specified by at least one parameter; while operating in the state, receiving a parameter-adjustment message from the base station; and in response to receiving the parameter-adjustment message and while still operating in the state, increasing the allocation size by adjusting the at least one parameter, thereby increasing an amount by which the data transmission rate increases.

In another respect, various embodiments of the present invention provide, in a base station configured to operate as part of a wireless communication system, a method comprising: while serving each of a plurality of access terminals in a respective active communication session, making a determination that a threshold number of the plurality of access terminals are operating under radio-frequency (RF) conditions that exceed a threshold quality level; and in response to the determination, transmitting to each particular access terminal that is one of the threshold number a parameter-adjustment message instructing the particular access terminal to apply an accelerated mode of increasing reverse-link data transmission rate when reverse-noise messages broadcast by the base station indicate that conditions for increasing the reverse-link data transmission rate are satisfied, wherein each of the plurality of access terminals transmits data to the base station on a respective reverse-link traffic channel.

In still another respect, various embodiments of the present invention provide an access terminal configured to operate in a wireless communication system that includes a base station, the access terminal comprising: means for operating in a state in which at least: the access terminal responds to receiving reverse-noise messages from the base station by (i) transmitting data on a reverse-link traffic channel to the base station at a data transmission rate based at least on the received reverse-noise messages and on a level of a resource in reserve for consumption in data transmission, and (ii) when the received reverse-noise messages indicate that conditions for increasing the data transmission rate are satisfied, replenishing the resource by an allocation size specified by at least one parameter; means for receiving a parameter-adjustment message from the base station while operating in the state; and means for responding to receiving the parameter-adjustment message while still operating in the state by increasing the allocation size by adjusting the at least one parameter, thereby increasing an amount by which the data transmission rate increases.

In yet another respect, various embodiments of the present invention provide a base station configured to operate as part of a wireless communication system, the base station comprising: means for serving each of a plurality of access terminals in a respective active communication session, and while serving each of the plurality, making a determination that a threshold number of the plurality of access terminals are operating under radio-frequency (RF) conditions that exceed a threshold quality level; and means for responding to the determination by transmitting to each particular access terminal that is one of the threshold number a parameter-adjustment message instructing the particular access terminal to apply an accelerated mode of increasing reverse-link data transmission rate when reverse-noise messages broadcast by the base station indicate that conditions for increasing the reverse-link data transmission rate are satisfied, wherein each of the plurality of access terminals transmits data to the base station on a respective reverse-link traffic channel.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

BRIEF DESCRIPTION OF THE DRAWINGS

FIG. 3 illustrates (a) example nominal parameters used in reverse-link rate control; and (b) modified parameters for accelerated increase of reverse-link data transmission rates, where the modification is achieved according to an example embodiment of dynamic adjustment of reverse-link rate-control parameters.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein simply as CDMA communications. IS-856 applies more exclusively to packet-data communications (including, e.g., real-time voice and data applications), and is referred to herein as "high rate" packet-data communications. Under IS-2000, packet-data communications are referred to as "1×-RTT" communications, also abbreviated as just "1×." However, since IS-2000 supports both circuit voice and packet data communications, the term 1× (or 1×-RTT) is sometimes used to more generally refer the IS-2000 air interface, without regard to the particular type of communication carried. Packet-data communications under IS-856 are conventionally referred to as "EVDO" communications, also abbreviated as just "DO." The terms EVDO, Rel. 0 and EVDO, Rev. A will be used herein to refer to IS-856, Rel. 0 and IS-856, Rev. A, respectively, and vice versa. Different versions of 1×-RTT may be similarly distinguished. Absent any specific version identification, EVDO will generally refer to any version of IS-856. It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
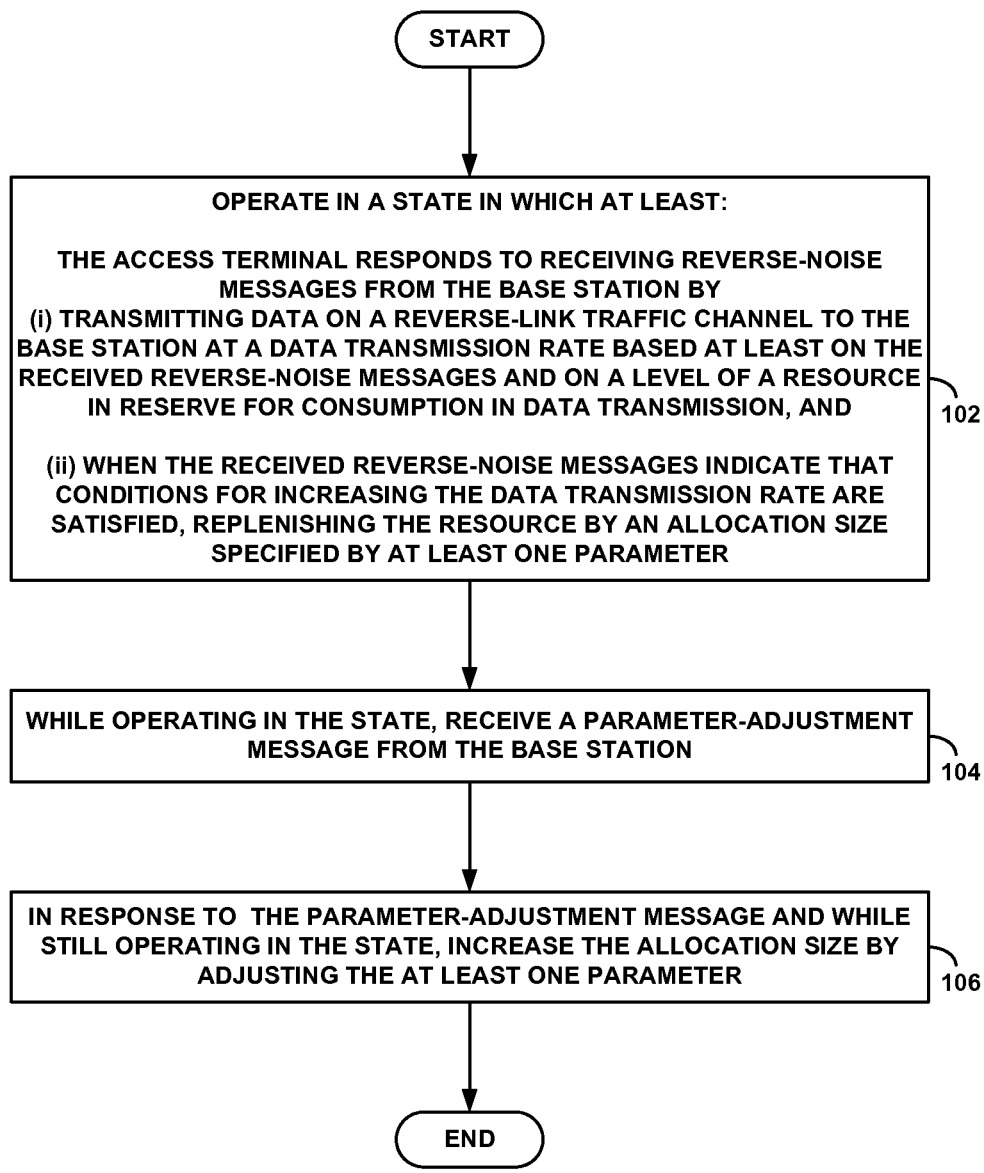
FIG. 1 is a flowchart illustrating an example embodiment of dynamic adjustment of reverse-link rate-control parameters.

FIG. 1 is a flowchart illustrating an example embodiment of dynamic adjustment of reverse-link rate-control parameters. By way of example, the steps of the flowchart could be implemented in an access terminal configured to operate according to a CDMA family of protocols, including IS-856, Rev. A, in a similarly-compliant wireless communication system that includes a base station (among other elements of a RAN). A base station typically comprises a BSC, a BTS, and a coverage area, such as a cell or a sector. The BSC may control more than one BTS, and the BTS may radiate (and receive) in more than one sector.

At step 102, the access terminal operates in a state in which, at least, the access terminal responds to receiving reverse-noise messages from the base station by (i) transmitting data on a reverse-link traffic channel to the base station at a data transmission rate based at least on the received reverse-noise messages and on a level of a resource in reserve for consumption in data transmission, and (ii) when the received reverse-noise messages indicate that conditions for increasing the data transmission rate are satisfied, replenishing the resource by an allocation size specified by at least one parameter.

At step 104, while operating in the state, the access terminal receives a parameter-adjustment message from the base station.

Finally, at step 106, in response to receiving the parameter-adjustment message and while still operating in the state, the access terminal increases the allocation size by adjusting the at least one parameter. In so doing, the access terminal increases an amount by which the data transmission rate increases.

For an access terminal operating according to IS-856, Rev. A in a sector (or cell or other form of coverage area) of a similarly-compliant RAN, the reverse-noise messages each comprise a reverse activity bit (RAB) broadcast by the BTS of the sector on a forward-link Reverse Activity Channel. As such, the RAB would be set according to whether the aggregate reverse-link noise for the sector was above or below a threshold noise level. In further accordance with the example embodiment, the AT transmitting data on the reverse-link traffic channel to the base station at a data transmission rate based at least on the received reverse-noise messages and on the level of a resource in reserve for consumption in data transmission comprises the AT transmitting data on the reverse-link traffic channel at a data transmission rate based at least on received RABs and determined in accordance with IS-856, Rev. A. More specifically, the access terminal computes short-term and long-term filtered or time-averaged values of RABs as they are received, and applies them to a procedure for determining its reverse-link data transmission rate. Briefly, the short-term filter, referred to as "Quick RAB" (QRAB), is used to determine whether to increase or decrease the rate, while the long-term filter, referred to as "Filtered RAB" (FRAB), is used as input to a resource-allocation function that ultimately determines how much to increase or decrease the rate.

Under IS-856, the AT's reverse link includes a pilot channel and a data traffic channel (among other channels). The AT's pilot channel carries a beacon (or pilot) signal that the base station uses for (among other purposes) maintaining a timing reference for decoding other reverse-link signals from the AT, and the AT's data traffic channel carries user data. The AT sets the pilot signal power level based on power-control commands received from the base station. According to IS-856, Rev. A, the AT's reverse-link data traffic channel power is set relative to the pilot channel power by a multiplicative factor referred to as "traffic-to-pilot" (abbreviated "T2P"). During an active data session, the AT periodically adjusts its data traffic channel power by periodically setting its T2P value. The AT sets its T2P value based, in part, on computed values of FRAB.

In practice, the power level of both the pilot and data traffic channels are usually specified as a gain level, x, according to the relation $x \text{ dBm} = 10 \log_{10}(P/1 \text{ mW})$, where P is the power in mW (milliwatts). As a relative level, T2P is then expressed in dB with respect to the pilot power. For example, T2P=+3 dB would correspond to a data traffic channel power twice that of the pilot channel, and T2P=+6 dB would correspond to a data traffic channel power four times that of the pilot channel. The total power of the reverse link pilot and data traffic channels would then be the sum of the powers of the individual channels. In terms of absolute power, a pilot power of 1 Watt and T2P=+3 dB would correspond to data traffic channel power of 2 Watts and a total power of 3 Watts. Similarly, if T2P=+6 dB, the total reverse link power of the pilot plus data traffic channels would be 5 Watts in this example.

As described in additional detail below, rate control under IS-856, Rev. A treats T2P as a resource that is "consumed" in the process of data transmission at a data transmission rate determined by, among other factors, the current level of the resource. When the current value of QRAB indicates that the AT can increase its reverse-link data transmission rate, the higher current level of the T2P resource in reserve the greater the increase in the rate, and vice versa. The T2P resource is replenished at a rate determined by factors including FRAB and current value of T2P, and by one or more parameters relating these two factors to a replenishment allocation size. Hence, the larger the replenishment allocation size, the higher the level of the T2P resource, and thus the more rapidly the AT can increase its reverse-link data transmission rate, when an increase is indicated (i.e., by QRAB).

In conventional operation, the size of the replenishment allocation for a given current value of FRAB and T2P is fixed according to a nominal value specified in the at least one parameter mentioned above. As such, when the AT acts to increase its reverse-link data rate by allocating additional T2P resource, the amount by which it can thereby increase the rate is limited to some extent by the size of the allocation as specified in the at least one parameter. In accordance with the example embodiment, when the AT increases the allocation size by adjusting the at least one parameter, it effectively introduces an accelerated increase in reverse-link data transmission rate over the nominal increase that would be applied conventionally. Advantageously, the AT can more quickly achieve higher reverse-link data rates. The AT's accelerated increase in reverse-link data transmission rate over the nominal increase can also be described as a more "aggressive" response to increasing its reverse-link rate, and the adjusted parameter may correspondingly be described as a more "aggressive" parameter.

In further accordance with the example embodiment, the at least one parameter is one of a plurality of parameters, each of which specifies a particular positive value of allocation size. In turn, increasing the allocation size by adjusting the at least one parameter comprises increasing the particular positive value of allocation size specified by at least one of the plurality of parameters. More particularly, the plurality of parameters can comprise a first set of T2P-increment values that specify how large to make T2P allocations when replenishing the T2P resource. Increasing the particular positive value of allocation size specified by the at least one of the plurality of parameters then comprises replacing the first set of T2P-increment values with a second, corresponding set of T2P-increment values, wherein at least one positive value of allocation size in the second set is larger than a corresponding particular positive value of allocation size specified in the first set. In other words, the AT replaces a set of nominal T2P-increment values with a set of more aggressive T2P-increment values.

As described above, the AT will make the increase to the allocation size in response to receiving the parameter-adjustment message. In still further accordance with the example embodiment, receiving the parameter-adjustment message from the base station will comprise receiving an indication from the base station that a threshold number of access terminals are operating under radio-frequency (RF) conditions that exceed a threshold quality level. More specifically, an accelerated increase in reverse-link data transmission rate will tend to improve overall system throughput if multiple access terminals can adopt this mode of more aggressive operation with respect to increased data rates. However, this more aggressive operation will generally only be supported for a given AT if it is operating under sufficiently favorable RF conditions. In turn, the derived benefit to overall system throughput will depend on how many ATs are operating under such favorable RF conditions at any given time. Therefore, the base station will determine if and when to transmit a parameter-adjustment message based on the expected benefit to overall system throughput. By determining that a threshold number of access terminals are operating under RF conditions that exceed a threshold quality level, the base station can thus help ensure that expected benefit will warrant causing the ATs to adopt the more aggressive operation.

In further accordance with the example embodiment, the parameter-adjustment message will included an updated version of the at least one parameter, wherein the updated version specifies an increased allocation size. Then increasing the allocation size by adjusting the at least one parameter will comprise setting the allocation size to the increased allocation size specified in the received updated version of the at least one parameter. For example, the parameter-adjustment message could include an updated T2P allocation size. As an alternative, the access terminal could maintain both nominal and aggressive versions of the at least one parameter, and be caused to adopt the aggressive version in response to a parameter-adjustment message that signals adjustment, but does not itself carry an updated parameter value.

Although not explicitly described in the steps of FIG. 1, the base station plays a role by determining if and when to transmit a parameter adjustment message. As noted, the base station transmits a parameter-adjustment message when it determines that a threshold number of a plurality of access terminals are operating under RF conditions that exceed a threshold quality level. The threshold number could be an absolute number, such as 15, or a fractional number of all active ATs in a sector, such as 0.7 (or 70%). In accordance with the example embodiment, this determination can comprise determining that the threshold number of the plurality of access terminals are each measuring a signal-to-noise ratio (SNR) that exceeds a threshold SNR level.

More particularly, for a base station and access terminals configured to operate under IS-856, determining that the threshold number of the plurality of access terminals are each measuring SNR that exceeds a threshold SNR level could comprises receiving a respective data rate control (DRC) message from each of the plurality of access terminals, and translating each respective DRC message to a SNR level that exceeds the threshold SNR level. Other measures of SNR could be used as well.

Note that the characterization of the state of step 102 in terms of the access terminal (i) transmitting data on a reverse-link traffic channel to the base station at a data transmission rate based at least on the received reverse-noise messages and on a level of a resource in reserve for consumption in data transmission, and (ii) replenishing the resource by an allocation size specified by at least one parameter should not be viewed as limiting the state to only the described behavior of that state. The state could include other behaviors as well, provided those other behaviors don't contradict or are not mutually exclusive with the explicitly-described behavior of the first state.

It will be appreciated that the steps of FIG. 1 are shown by way of example, and that additional and/or alternative steps or alternative ordering of steps could be carried out and still remain within the scope and spirit of the present invention.

Figure 2:
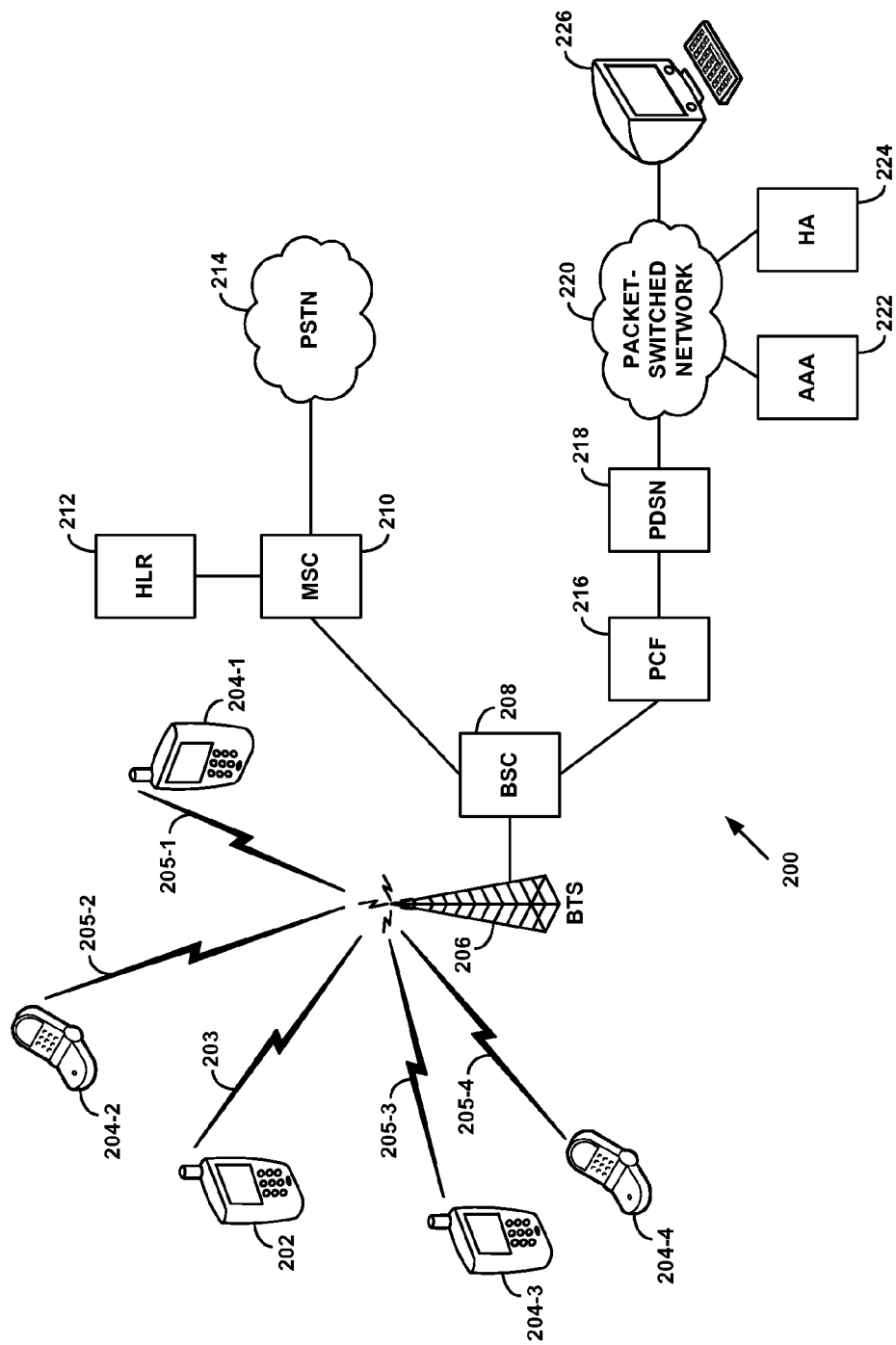
FIG. 2 is a simplified block diagram of a wireless communication system in which an example embodiment of dynamic adjustment of reverse-link rate-control parameters can be employed.

FIG. 2 shows a simplified block diagram of a wireless communication system 200 in which an example embodiment of dynamic adjustment of reverse-link rate-control parameters can be employed. Access terminal AT 202 communicates over an air interface 203 with a BTS 206, which is then coupled or integrated with a BSC 208. Transmissions over air interface 203 from BTS 206 to AT 202 represent the forward link to the access terminal (also referred to herein alternatively as the forward link from the base station, and as "the AT's forward link"). Transmissions over interface 203 from AT 202 to BTS 206 represent the "reverse link" (also referred to herein as "the AT's reverse link"). Four other access terminals, AT 204-1, 204-2, 204-3, and 204-4, are also depicted in FIG. 2. As indicated, they communicate with BTS 206 over air interfaces 205-1, 205-2, 205-3, and 205-4, respectively. Each of these air interfaces is operationally similar to air interface 203, each representing at least a forward and reverse link. It will be appreciated that this arrangement is for purposes of illustration.

BSC 208 is connected to MSC 210, which acts to control assignment of air traffic channels (e.g., over air interface 203, 205-1, 205-2, 205-3, and 205-4), and provides access to wireless circuit-switched services such as circuit-voice and circuit-data (e.g., modem-based packet data) service. As represented by its connection to PSTN 214, MSC 210 is also coupled with one or more other MSCs or other telephony circuit switches in the operator's (or in a different operator's) network, thereby supporting user mobility across MSC regions, and local and long-distance landline telephone services. Also connected to MSC 210 is home location register (HLR) 212, which supports mobility-related aspects of subscriber services, including dynamic tracking of subscriber registration location and verification of service privileges.

As shown, BSC 208 is also connected with a PDSN 218 by way of packet control function (PCF) 216. PDSN 218 in turn provides connectivity with a packet-switched network 220, such as the Internet and/or a wireless carrier's private core packet-network. Sitting as nodes on network 220 are, by way of example, an authentication, authorization, and accounting (AAA) server 222, a mobile-IP home agent (HA) 224, and a remote computer 226. After acquiring an air traffic channel over its air interface, an access terminal (e.g., AT 202) may send a request to PDSN 218 for a connection in the packet data network. Then, following authentication of the access terminal by AAA server 220, the access terminal may be assigned an IP address by the PDSN or by HA 224, and may thereafter engage in packet-data communications with entities such as remote computer 226.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as example access terminals 202, 204-1, 204-2, 204-3, and 204-4 typically comprises a user-interface, I/O components, a communication interface, a tone detector, a processing unit, and data storage, all of which may be coupled together by a system bus or other mechanism. As such, system 200, ATs 202, 204-1, 204-2, 204-3, and 204-4, and air interfaces 203, 205-1, 205-2, 205-3, and 205-4 collectively are representative of example means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. Conventional CDMA Communications

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, data are transmitted in units of frames on both the forward link and reverse link. On either link, communications in a given wireless service sector are encoded with the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

Concurrent communication in multiple forward-link channels on a common frequency in a sector is supported by allocating each channel a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary as the AT moves about within the wireless communication system, or as other factors cause the AT's RF conditions to change. More particularly, the AT monitors a signal-to-noise metric referred to as "signal to interference plus noise ratio" ("SINR"), which includes the degrading effects of interference as well as noise on RF conditions. The AT reports the received signal strengths to the serving base station, which then directs the AT to update its active set in accordance with the reported strengths and one or more threshold conditions.

Operationally, an IS-2000 system is arranged to transmit the same data concurrently on a given carrier frequency in some or all of the sectors of a given AT's active set, encoding each transmission according to the PN offset of the respective sector and the Walsh code for the assigned channel therein. Correspondingly, the AT recognizes the concurrent transmissions according to the PN offsets of the sectors in its active set and the Walsh codes of its assigned channels. That is, operating under IS-2000, the AT will decode transmissions using all the PN offsets in its active set, together with the respective Walsh codes assigned for each PN-identified sector. The concurrent transmissions in sectors of the AT's active set provides an added level of reliability to communications, as well as possibly increased quality owing to improved signal to noise characteristics. The concurrency also facilitates soft handoff between sectors, as described above. A soft handoff between sectors the same BTS is referred to as a "softer handoff."

With the arrangement described above, an access terminal can engage in cellular voice and/or in packet-data communications. Referring again to FIG. 2, and taking an originating call from AT 202 as an example, AT 202 first sends an origination request over air interface 203 and via the BTS 206 and BSC 208 to MSC 210. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session (i.e., 1X-RTT), the BSC signals to the PDSN 218 by way of PCF 216. The PDSN 218 and access terminal 202 then negotiate to establish a data link layer connection, such as a point to point protocol (PPP) session. Further, the PDSN 218 sends a foreign agent advertisement that includes a challenge value to the access terminal, and the access terminal responds with a mobile-IP registration request (MIP RRQ), including a response to the challenge, which the PDSN forwards to HA 224. The HA then assigns an IP address for the access terminal to use, and the PDSN passes that IP address via the BSC to the access terminal.

2. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM) in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps on its forward link.

TDM access on the IS-856 forward link is achieved by dividing the forward link in the time domain into time slots of length 2048 chips each. At a chip rate of 1.228 Mega-chips per second, each slot has a duration of 1.67 milliseconds (ms), or a rate of 600 time slots per second. Every 16 slots comprise a frame, corresponding to 26.67 ms per frame, and frame boundaries are synchronous across all sectors of a RAN.

Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst, for 256 MAC-channel chips per slot. The MAC channel is further subdivided into a Reverse Activity sub-channel, a "data rate control" (DRC) Lock sub-channel, an ARQ sub-channel, and a reverse power control (RPC) sub-channel. The remaining 1600 chips of each time slot (800 per half-slot) are allocated for a forward traffic channel or a forward control channel, so that any given time slot will carry either AT-specific traffic-channel data (if any exists) or AT-specific control-channel data. While the 1600 chips of forward-link traffic and/or control channel data of any given time slot are designated on a TDM basis to a specific access terminal, the MAC channel chips are encoded using different Walsh codes in order to broadcast different MAC sub-channels concurrently over the same MAC-channel chips and/or to transmit different AT-specific MAC-sub-channel data concurrently to different ATs on the same MAC-channel chips. As in IS-2000, each sector in IS-856 is defined by a PN offset, and the pilot channel carries an indication of the sector's PN offset.

The reverse link under IS-856 retains largely the traditional IS-2000 code division multiplexing (CDM) format, albeit with the addition of a "data rate control" (DRC) channel used to indicate the supportable data rate and best serving sector for the forward link. More specifically, in maintaining its active set, the AT continually monitors the pilot signal from each sector in its active set to determine which has the best RF conditions on its forward link. The quality of the RF conditions on a forward link is measured in terms of SINR (or a similar metric), and the selected sector is designated the AT's "serving sector."

Typically, the power level of the pilot is specified as a gain level, x, according to the relation x dBm=10 $\log_{10}$(P/1 mW), where P is the power in mW (milliwatts). However, other power units could be specified. Measured in dBm, gain expresses a logarithmic ratio of power P to a fixed power level of 1 mW. More generally, the relative gain, y, of one power level $P_1$ to another $P_2$ is expressed as dB, and corresponds to a logarithmic ratio of $P_1$ to $P_2$ given by y dB=10 $\log_{10}(P_1/P_2)$. For instance, if y=3, then $P_1 \approx 2 \times P_2$; if y=−3, then $P_1 \approx 0.5 \times P_2$. In practice, SINR is measured in dB, where $P_1$ corresponds to the received power of the pilot and $P_2$ corresponds to the received noise plus interference power.

The AT determines the supportable data rate on the forward link by using the measured SINR of its serving sector to select one of several pre-determined data rates in a look-up table stored in the AT's memory, for instance. The AT then transmits a request for the selected data rate in a DRC message on the AT's reverse-link DRC sub-channel to its serving sector. An example of the DRC rate table is presented in Table 1.

TABLE 1

Associating SINR with data rate and DRC code

| SINR (dB) | Data Rate (kbps) | DRC code |
|---|---|---|
| Null | Null | 0 |
| −11.4 | 38.4 | 1 |
| −9.2 | 76.8 | 2 |
| −6.5 | 153.6 | 3 |
| −3.9 | 307.2 | 4 |
| −3.8 | 307.2 | 5 |
| −0.4 | 614.4 | 6 |
| −0.6 | 614.4 | 7 |
| 2.2 | 921.6 | 8 |
| 4.5 | 1,228.8 | 9 |
| 4.3 | 1,228.8 | 10 |
| 8.7 | 1,843.2 | 11 |
| 11.1 | 2,457.6 | 12 |
| 6.3 | 1,536 | 13 |
| 13.0 | 3,072 | 14 |

Each value of SINR in the table represents a lower bound (in dB) above which the associated data rate can be supported (and thus requested in a DRC message), and each consecutive pair of SINR values corresponds to a range within which the data rate associated with the lower end of the range may be requested. For instance, a value of SINR between −0.6 dB and +2.2 dB corresponds to a data rate of 614.4 kbps. As another example, a value of SINR between 8.7 dB and 11.1 dB corresponds to a data rate of 1,843.2 kbps, while SINR above +13.0 dB corresponds to a data rate of 3,072 kbps. Data rate values that appear twice are those for which the DRC codes specify different encoding schemes for the same rate. It will be appreciated that the values in Table 1 are examples, and others could be used.

After selecting an appropriate data rate based on SINR, the AT transmits the corresponding DRC code in a DRC request message, encoded into a four-bit "DRC symbol." The AT also includes the PN offset of the serving sector in the DRC request. In conventional operation, the serving sector (or base station) responds to the DRC request message by transmitting data on the forward link to the AT at the requested rate, without determining if the backhaul capacity can support the requested rate. In doing so, the serving base station uses a look-up table (or other recorded data structure) having the same mapping of DRC codes to forward-link data rates as Table 1 to interpret the received DRC request.

The IS-856 reverse link also includes an access channel and a traffic channel. The access channel is used by an AT that is not in a connected state (i.e., not in an active data session) to signal to the RAN in order to establish a data session. The traffic channel is used by an AT in a connected state to transmit data, as well as signaling and control information, to the RAN. Both the access and traffic channels include the pilot signal that serves as beacon signal for identifying the AT to the RAN and for establishing and maintaining a timing reference for decoding other signals received at the RAN from the AT. Packet-data rates achievable on the reverse-link traffic channel depend on the version of IS-856; under Rel. 0, an AT can achieve a maximum reverse-link burst rate of 153.6 kilobits per second (kbps), while under Rev. A, an AT achieve a maximum reverse-link burst rate of 1.8 Megabits per second (Mbps).

Power control of the reverse link under IS-856 employs one or more feedback procedures by which an AT adjusts its reverse-link power and data rates in response to commands from the AT's serving sector that are aimed both at maintaining a particular AT-specific reverse-link error rate within an AT-specific threshold error rate, and at maintaining an aggregate reverse-link noise level below a threshold noise level. Regarding aggregate reverse-link noise and load, each sector periodically broadcasts a RAB on its Reverse Activity sub-channel, wherein the value of the RAB depends on the aggregate reverse-link noise measured by sector. An AT responds to each RAB received from each of its active-set sectors by adjusting the transmission power and/or transmission rates of its reverse data channel according to procedures compliant with one or another of Rel. 0 and Rev. A versions of IS-856. In particular, the AT adjusts its data channel transmission power and transmission rate relative to its pilot power level based on the RAB received from the sector and on the particular protocol version.

More specifically, the sector continually measures an aggregate of reverse link transmission power and every 1.67 ms (i.e., every time slot) computes a noise metric referred to as reverse noise rise (RNR). RNR is the difference between (i) the reverse noise that the access node is currently detecting and (ii) a baseline level of reverse noise. Thus, the sector computes how far the reverse noise has risen above that baseline. When the computed RNR exceeds a threshold RNR value, the sector sets the RAB to one; when the computed RNR does not exceed the threshold RNR value, the sector sets the RAB to zero. The RNR threshold is a configurable system parameter that can range from 0 dB to 30 dB. Hence, a RAB set to one corresponds to higher reverse-link noise (and less favorable RF conditions), while a RAB set to zero corresponds to lower reverse-link noise (and more favorable RF conditions).

The sector periodically broadcasts the RAB to served access terminals on its Reverse Activity sub-channel at a rate typically in multiples of once per frame, up to a maximum of 16 times per frame, corresponding to once per time slot. Each RAB value is broadcast over an integer number of consecutive time slots of a frame, after which a new RAB (possibly with the same value as the previous RAB) is broadcast over the same integer number of slots. The integer number is set in a parameter conventionally referred to as "RABlength." For example, for RABlength=4, the sector would broadcast a given RAB over four time slots, and would generate four distinct RAB broadcasts per 16-slot frame (each RAB being independently determined as 0 or 1). An AT with an active EVDO data session will, in turn, adjust its data channel power level and transmission rate according to the RABs received over each RABlength number of time slots.

Under IS-856, Rel. 0, an AT can transmit on its reverse link at one of five rates: 9.6 kbps, 19.2 kbps, 38.4 kbps, 76.8 kbps, and 153.6 kbps. The consecutive order of the listed rates defines the order in which the AT may transition between rates. At the start of a data session, the AT transmits at 9.6 kbps, then over the course of the session transitions among the other rates based on received RABs and a transition probability integer for each transition. Specifically, the AT will transition up or down from its current rate to the next consecutive higher or lower rate depending on the value (one or zero) of the RAB and based on a probability test that controls whether or not to make the transition. For a RAB set to one, the AT will transition from its current rate to the next lower rate with a probability determined by the outcome of a test for the particular downward transition. Conversely, for a RAB set to zero, the AT will transition from its current rate to the next higher rate with a probability determined by the outcome of a test for the particular upward transition. When the RAB of any one of the AT's active-set sectors is one, the AT treats the RAB of all of its active-set sectors as being set to one.

Each probability test is a uniform random selection of an integer between 0 and 255. If the selected integer is smaller than a transition probability integer (also in the range between 0 and 255) for the particular current-to-new rate pair, the AT transitions up or down to the next rate. If the selected integer is not smaller than the transition probability integer, the AT remains at its current rate. The AT then sets its reverse-link data channel transmission power to accommodate the selected rate. If a given increased data rate requires a higher transmission power than the AT is allowed at a particular time, the AT will not make the upward transition.

Under IS-856, Rev. A, an AT computes a short-term and a long-term historical indicator of RAB values reported by the base station in order to adjust a flow-control mechanism on its reverse-link. Both indicators are computed as mathematical digital filters, but differ in the time ranges over which the filters are applied. As discussed above, the short-term filter, QRAB, gives a snapshot of the current state of the RAB, while the long-term filter, FRAB, yields a time-averaged value of RABs received over a much longer time interval that precedes the moment at which FRAB is computed. In practice, each RAB broadcast is modulated by the sector to a value of either −1 for RAB=0 or +1 for RAB=1. Correspondingly, the AT computes the QRAB as either −1 or +1, and computes FRAB as a real number in the range [−1, 1]. The AT uses both QRAB and FRAB to adjust its reverse-link data channel transmission power according to a procedure that treats T2P as a resource, as discussed above and described in more detail below. The effective reverse-link data rates can range from 19.2 kbps up to 1.84 megabits per second (Mbps) under IS-856, Rev. A.

Operation in an IS-856 compliant communication system may be illustrated, again with reference to FIG. 2. To acquire packet data connectivity under IS-856, after an access terminal first detects an EVDO carrier, the access terminal sends to its BSC (or RNC) 208 a UATI (Universal Access Terminal Identifier) request, and receives in response an UATI, which the access terminal can then use to identify itself in subsequent communications with the BSC. The access terminal then sends a connection-request to the BSC 208, and the BSC responsively invokes a process to authenticate the access terminal and to have the access terminal acquire a data link.

In particular, the BSC 208 sends an access request to an Access Network AAA (ANAAA) server (which may be different than the AAA server 222), and the ANAAA server authenticates the access terminal. The BSC 208 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 218 (via PCF 216), and the PDSN and access terminal then negotiate to establish a PPP data link. In addition, as in the IS-2000 process, the access terminal then sends an MIP RRQ to the PDSN, which the PDSN forwards to the HA 224, and the HA assigns a mobile-IP address for the access terminal to use.

3. Adapting Reverse-Link Rate-Control Parameters to Operating Conditions a. Operating Principles Under IS-856, the reverse power-control procedures are based on one form or another of RAB monitoring by the AT. Since the RAB is an indicator of aggregate reverse-link noise (i.e., RNR), the reverse power-control procedures can be understood as helping to balance the reverse power and data rates achievable by the AT with the AT's contribution to the aggregate reverse-link noise and overall load from all ATs served by a given sector. In other words, reverse power-control procedures comprise a feedback mechanism, with the RAB acting as a feedback variable.

Under IS-856, Rev. A, reverse power control treats T2P like a resource, and invokes a mechanism for resource allocation and management that is sometimes referred as a "token bucket." An amount "BucketLevel" of T2P resource in the bucket at any time is a function of an amount "T2PInflow" of T2P resource the AT adds to the bucket and an amount "T2POutflow" the AT removes from the bucket during data transmission. The AT periodically determines whether to increase or decrease T2PInflow according to whether the current value of QRAB is −1 or +1, respectively. The amount of increase (when QRAB=−1) is then determined based in part on parameters that associate FRAB and QRAB with an allocation size.

From the T2P inflow and current BucketLevel, the AT determines an amount of T2P resource that can be used at a given time during a transmission. The AT then sets a packet size and a transmission power level based on the amount of T2P resource that can be used. Note that this amount can sometimes momentarily exceed the inflow rate, and thereby occasionally accommodate high rate data bursts. In general, the higher the BucketLevel, higher the data transmission rate, and vice versa. As a consequence, the rate at which the AT can transmit is related to the rate at which it can replenish its BucketLevel, which in turn is related to the T2P allocation sizes specified in the T2P allocation parameters.

In conventional operation, the parameters have fixed nominal values. Hence, the rate at which the T2P resource can be replenished is limited. However, an AT may be operating under RF conditions that would support more rapid replenishment of the T2P resource than is possible based on the fixed nominal parameter values. Accordingly, embodiments of the present invention provide for dynamic adjustment of reverse-link rate-control parameters in response to operating conditions.

b. Adjusting Rate-Control Parameters

FIG. 3 illustrates (a) example nominal reverse-link rate-control parameters such as those that could be used by an AT in conventional operation under IS-856, Rev. A, and (b) example, modified parameters that would cause the AT to operate more aggressively with respect to increasing reverse-link data transmission rates. In practice, a plurality of parameter values are arranged in a table that is stored in the AT's memory. The example nominal parameter values are shown in table 302 at the top of FIG. 3. The values in the table represent ΔT2P (increments or decrements to T2P) in units of dB. Each row of the table is associated with a range of current T2P value, while the columns are organized according to the value of QRAB, indicated above the top row. As indicated for QRAB=−1, ΔT2P is greater than or equal to zero (first three columns), while for QRAB=+1, ΔT2P is less zero (last two columns). The actual values of ΔT2P depend on the value of FRAB for the associated column, indicated below the bottom row. For example, for current T2P in the range 8.875≤x dB<11.25 and FRAB between −0.5 and −1.0, ΔT2P=3 dB. Accordingly, the AT would increase its T2P resource by 3 dB for those values of current T2P and FRAB.

Note that the AT will decrease its T2P resource level when QRAB=+1 and FRAB is positive. This corresponds to short-term and long-term trends in RAB indicating high reverse-link loading (as measured by the sector), so reducing the T2P resource level in under these conditions is warranted.

Considering only positive values of ΔT2P, the nominal values limit how much the AT can increase its T2P resource level when an increase is warranted. I.e., when reverse-link loading (as measured by the sector) is low (as indicated at the AT by QRAB=−1 and FRAB is less than or equal to zero).

In accordance with the example embodiment, a sector (or an associated base station element) will determine when a threshold number of access terminals with active EVDO sessions are operating under RF conditions that exceed a threshold quality level, and will responsively transmit a parameter-adjustment message to those access terminals. Upon receiving the parameter-adjustment message, the access terminals that are operating under the favorable RF conditions will modify their rate control parameters. More particularly, they will begin using a table such as table 304 (bottom FIG. 3) that has more aggressive positive values of ΔT2P.

The format of table 304 is the same as that of table 302, but the parameter values for positive ΔT2P are different, and in particular are larger than the corresponding nominal values. For example, for current T2P in the range 8.875≤x dB<11.25 and FRAB between −0.5 and −1.0, ΔT2P=4 dB, or a 1 dB increase over the nominal value of 3 dB. Accordingly, the AT would increase its T2P resource by 4 dB for those values of current T2P and FRAB. The other positive values in table 304 are also 1-2 dB larger than the nominal values. It will be appreciated that other values could be used as well.

By using table 304, the AT will advantageously increase it T2P resource level at a faster rate than when using the nominal values of table 302 (or a similar table of nominal values). As a result, the AT will be able to achieve higher reverse-link data transmission rates more quickly than with the nominal values. Accordingly, the term "accelerated mode" will also be used to describe the behavior of an AT that is using the more aggressive parameters. Since the AT will switch to the aggressive values in response to a parameter-adjustment message from the sector, it will only adopt the more aggressive behavior under operating conditions that can support accelerated increases in reverse-link transmission rates. Namely, when the sector determines that the threshold number of access terminals with active EVDO sessions are operating under RF conditions that exceed the threshold quality level.

In further accordance with the example embodiment, the determination will be based on SNR measures reported by access terminals with active EVDO sessions in the sector. Specifically, each access terminal with an active EVDO session periodically transmits a DRC message to its serving sector. As described above, the DRC message encodes a requested forward-link data rate, and is based on the SINR measured by the AT for the sector. While the conventional purpose of the DRC message as received by the sector from a given AT is to determine an appropriate forward-link rate for the AT, in accordance with the example embodiment, the sector will also use a table similar to Table 1 above to translate the received DRC into a SINR measured by the AT. The sector can thus determine RF operating conditions of the AT based on SINR. By way of example, the threshold quality level could be set at SINR=4.3 dB, corresponding to a DRC code of 10 or greater. It will be appreciated that other values could be used as well.

By making such a determination for each AT sending DRC messages to the sector, the sector can determine how many of the ATs are operating above the SINR (or other form of SNR) threshold. If the number exceeds the threshold number, then the sector will transmit a parameter-adjustment message to the ATs. The parameter-adjustment message could be directed only to those ATs with SINR measures above the quality threshold, or it could be broadcast to all ATs in the sector. In the latter case, only ATs that are actually operating above the threshold SINR would respond by switching to the aggressive parameters.

Application of the SINR threshold ensures that an AT's RF conditions support operating in the accelerated mode. Application of the number threshold ensures that a sufficient number of ATs can operate in an accelerated mode so that the overall gain in system throughput will be high enough to warrant signaling the ATs to do so. Note that the number threshold could be an absolute number, such as 15 (for example), or a percentage of active ATs in the sector, such as 70% (for example).

4. Implementation of Example Embodiment

As described above, the example embodiment involves actions and operations carried out by both the access terminal and the base station (or sector). As such, the example embodiment may be considered as comprising a "client-side," associated with the access terminal (or other client communication device), and a "system-side," associated with the base station (or sector, or other RAN element). The example embodiment can be implemented as executable steps and operations of a client-side method carried out by an access terminal, and as executable steps and operations of a system-side method carried out by a base station (or BTS cell or sector).

Implementation of the example embodiment can further be considered as including means for carrying out both the client-side method and the system-side method. An example implementation of both the client-side method and means and the system-side method and means is described below. By way of example, both the access terminal and the base station are taken to be configured to operate according to IS-856, Rev. A, in a similarly-compliant wireless communication system, such as the one described above in connection with FIG. 2.

a. Example Method Implementation in an Access Terminal

Figure 4:
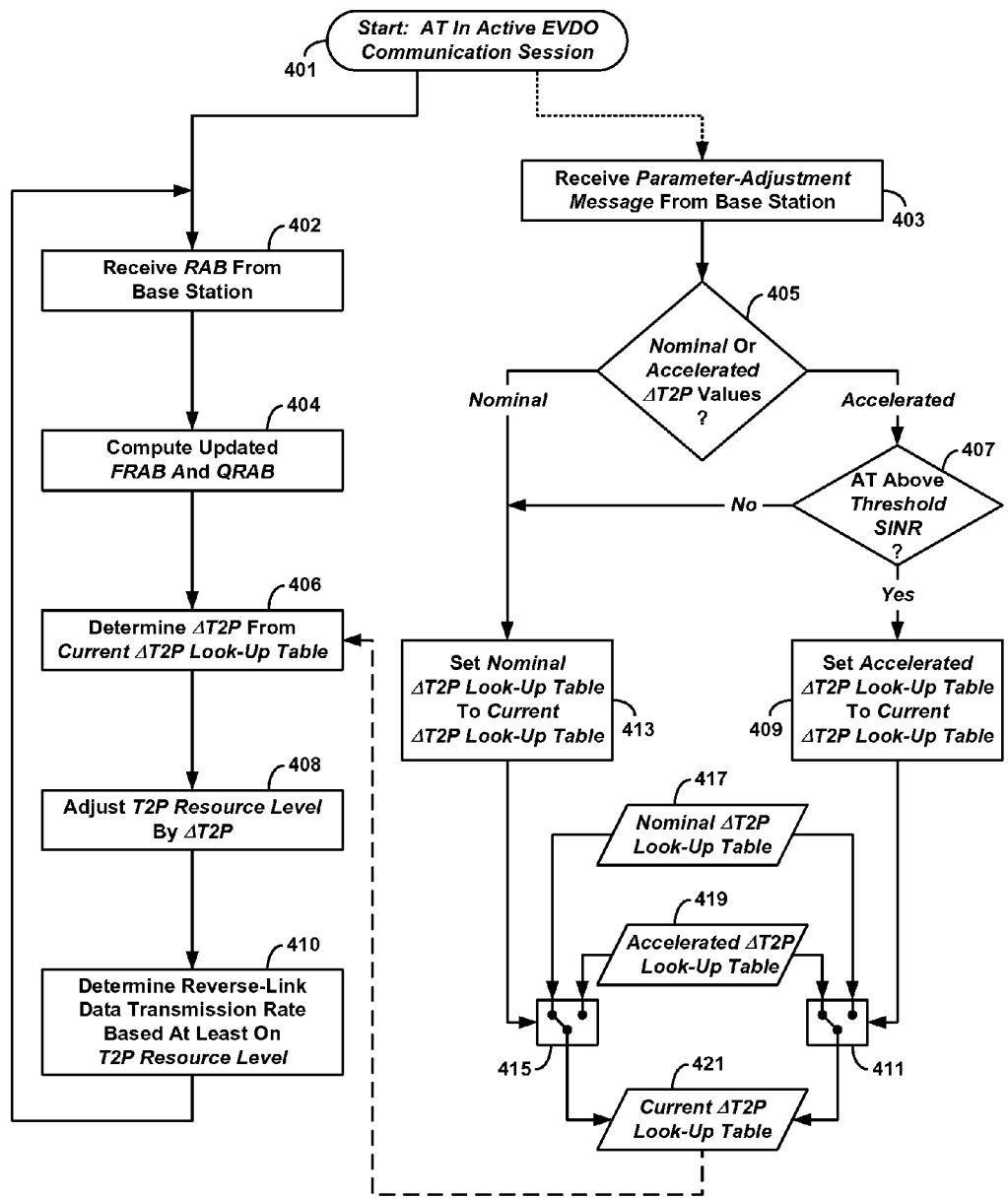
FIG. 4 illustrates an example embodiment of logical steps for implementing in an access terminal a method of dynamic adjustment of reverse-link rate-control parameters.

FIG. 4 is a logical flowchart representing executable steps and operations that could be carried out by an access terminal to implement an example client-side method of dynamic adjustment of reverse-link rate-control parameters. The illustrated steps could be implemented in an AT (or similar device) as executable instructions stored in the memory of the AT and executed by one or more processors of the AT. The executable instructions could also be stored on some form of non-transitory tangible computer readable storage medium, such as magnetic or optical disk, or the like, and provided for transfer to the AT's memory during configuration or other step(s) for preparing the AT for operation.

By way of example, the AT is taken to be initially in an active EVDO session in a sector (referred to generically as a base station). This is indicated at the start step 401. At step 402 the AT receives a RAB from the base station, and at step 404 it computes an updated FRAB and QRAB from the received RAB. The manner in which this is done is in accordance with IS-856, Rev. A, as is known in the art.

At step 406, the AT uses the current QRAB, FRAB, and T2P values to determine an allocation size $\Delta$T2P to add to the current T2P resource (i.e., BucketLevel). In accordance with the example embodiment, the AT will use a look-up table such as tables 302 or 304 in FIG. 3. As will be described, the example logic employs two versions of the look-up table, selecting one or the other according to which is currently set as the "current" look-up table. This is indicated at step 406 by the designation of "Current $\Delta$T2P Look-Up Table" and the dashed arrow pointing from Current $\Delta$T2P Look-Up Table 421 to logic block 406.

At step 408, the AT adjusts the T2P resource level by the allocation size $\Delta$T2P. Note that this could be a positive or negative adjustment, depending on the sign of $\Delta$T2P, which in turn depends on the values of FRAB and QRAB.

Finally, at step 410, the reverse-link data transmission rate is determined based at least in part on the T2P resource level (i.e., BucketLevel). As described above, the higher the resource level, the higher the data rate. Note that steps 402-410 describe only the adjustment of $\Delta$T2P, the T2P resource level, and the data rate. It will be appreciated the AT will actually transmit data at the determined rate, although this is not explicitly described in the figure.

The example logic of FIG. 4 also includes the AT's response to receiving a parameter-adjustment message from the base station, and in particular how it controls the current T2P look-up table. This process begins following step 401, where at step 403 the AT receives the parameter-adjustment message from the base station. Since receipt of this message depends on conditions that are monitored by the base station, the arrow from step 401 to 403 is dashed to indicate the event-like nature of receiving the message.

At step 405, the AT determines if the parameter-adjustment message indicates the nominal or accelerated (aggressive)

ΔT2P values. As shown, two versions of the look-up table are maintained: a "Nominal ΔT2P Look-Up Table" 417 and an "Accelerated ΔT2P Look-Up Table" 419. These could correspond to tables 302 and 304, respectively, in FIG. 3, for instance. If at step 405 the accelerated values are indicated ("Accelerated" branch from step 405), the process advances to step 407, where the AT determines if it is operating above the SINR threshold. If it is ("Yes" branch from step 407), the process advances to step 409 where the AT sets the Accelerated ΔT2P Look-Up Table 419 to the Current ΔT2P Look-Up Table 421. This is accomplished by setting logical switch 411 to make the Current ΔT2P Look-Up Table 421 logically point to the Accelerated ΔT2P Look-Up Table 419. In this way, the determination of ΔT2P at step 406 described above uses the accelerated parameter values. In practice, the logical switch 411 could be implemented using memory pointers, as will be appreciated by those of skill in the art.

If at step 407 the AT determines it is not operating above the SINR threshold ("No" branch from step 407), the process advances to step 413 where AT sets the Nominal ΔT2P Look-Up Table 417 to the Current ΔT2P Look-Up Table 421. This is accomplished by setting logical switch 415 to make the Current ΔT2P Look-Up Table 421 logically point to the Nominal ΔT2P Look-Up Table 417. In this way, the determination of ΔT2P at step 406 described above uses the nominal parameter values. In practice, the logical switch 415 could also be implemented using memory pointers, as will be appreciated by those of skill in the art.

If at step 405 the AT determines that the parameter-adjustment message indicates nominal values ("Nominal" branch from step 405), the process advances the process advances to step 413 where AT sets the Nominal ΔT2P Look-Up Table 417 to the Current ΔT2P Look-Up Table 421. Again, this is accomplished by setting logical switch 415 to make the Current ΔT2P Look-Up Table 421 logically point to the Nominal ΔT2P Look-Up Table 417. Once more, the determination of ΔT2P at step 406 described above uses the nominal parameter values.

It will be appreciated that the steps shown in FIG. 4 are meant to illustrate operation of an example embodiment. For instance, the determination by the AT of whether it is operating above the SINR threshold (step 407) indicates that the parameter-adjustment message could be broadcast by the base station to all ATs, rather than selectively transmitted to only those AT that are operating above the SINR threshold. In addition, various steps could be altered or modified, the ordering of certain steps could be changed, and additional steps could be added, while still achieving the overall desired operation.

b. Example Method Implementation in a Base Station

Figure 5:
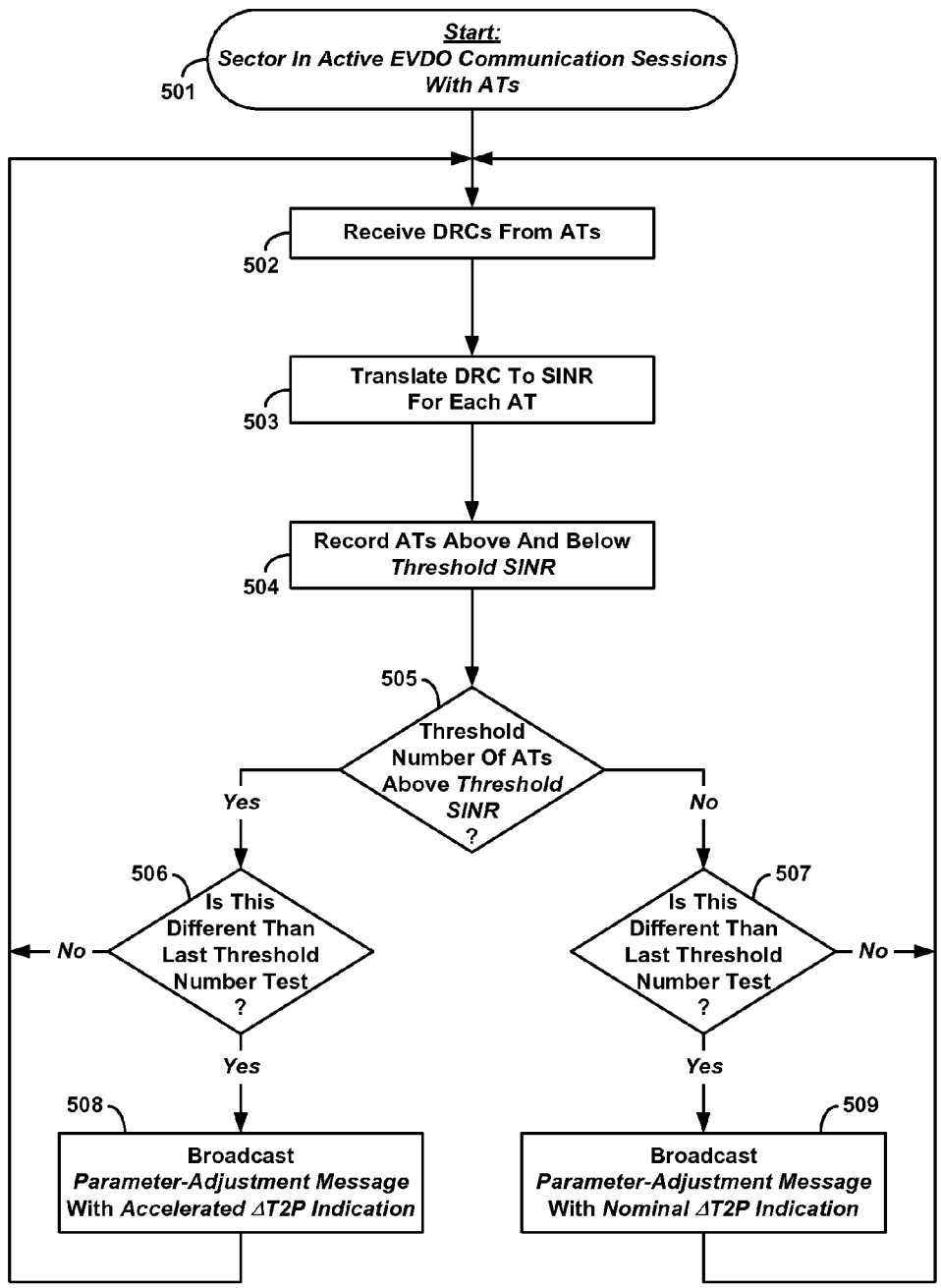
FIG. 5 illustrates an example embodiment of logical steps for implementing in a base station a method of dynamic adjustment of reverse-link rate-control parameters.

FIG. 5 is a logical flowchart representing executable steps and operations that could be carried out by base station to implement an example system-side method of dynamic adjustment of reverse-link rate-control parameters. The illustrated steps could be implemented in a base station, BTS (or other RAN element) as executable instructions stored in the memory of the base station and executed by one or more processors of the base station. The executable instructions could also be stored on some form of non-transitory tangible computer readable storage medium, such as magnetic or optical disk, or the like, and provided for transfer to the base station's memory during configuration or other step(s) for preparing the base station for operation.

At the start 501, the base station, referred to generically as a sector, is engaged active EVDO data sessions with a plurality of access terminals. At step 502, the sector receives DRC messages from the ATs. Note that the DRCs will not necessarily all be received synchronously, so step 502 may be considered as representing a time interval over which DRC messages are asynchronously received.

At step 503 the sector translates each DRC to a corresponding SINR for each AT. For instance, the sector can use a table such as Table 1 described above to make the translations. At step 504 the sector separately tallies the number of SINR values above and below the threshold SINR, keeping a record of the tallies. The sector may also record the specific ATs which are above or below the threshold SINR (where equality could be included with above the threshold, for example).

At step 505 the sector determines if greater than (or greater than or equal to) a threshold number of ATs have SINR above the threshold SINR. If the threshold number is exceeded ("Yes" branch from step 505), the process advances to step 506 where the sector determines if this threshold number test at step 505 is different from the previous test, or if it represents the same as the previous result. If this is a new result ("Yes" branch from step 506), then the condition represents a change in state with respect to the numbers of ATs above the threshold SINR. In this case, at step 508 the sector broadcasts a parameter-adjustment message with an indication to use accelerated ΔT2P parameters. ATs that receive this parameter-adjustment message and are above the SINR threshold will switch to using the accelerated parameters.

If at step 506 the sector determines that the threshold test result of step 505 is not a new result ("No" branch from step 506), then the process returns to step 502. In this case, there is no change since the previous pass through the logic at step 505.

If at step 505 the threshold number is not exceeded ("No" branch from step 505), the process advances to step 507 where the sector determines if this threshold number test at step 505 is different from the previous test, or if it represents the same as the previous result. If this is a new result ("Yes" branch from step 507), then the condition represents a change in state with respect to the numbers of ATs below the threshold SINR. In this case, at step 509 the sector broadcasts a parameter-adjustment message with an indication to use nominal ΔT2P parameters. ATs that receive this parameter-adjustment message and are above the SINR threshold will switch to using the nominal parameters.

If at step 507 the sector determines that the threshold test result of step 505 is not a new result ("No" branch from step 507), then the process returns to step 502. In this case, there is no change since the previous pass through the logic at step 505.

It will be appreciated that the steps shown in FIG. 5 are meant to illustrate operation of an example embodiment. As such, various steps could be altered or modified, the ordering of certain steps could be changed, and additional steps could be added, while still achieving the overall desired operation.

c. Example Access Terminal

Figure 6:
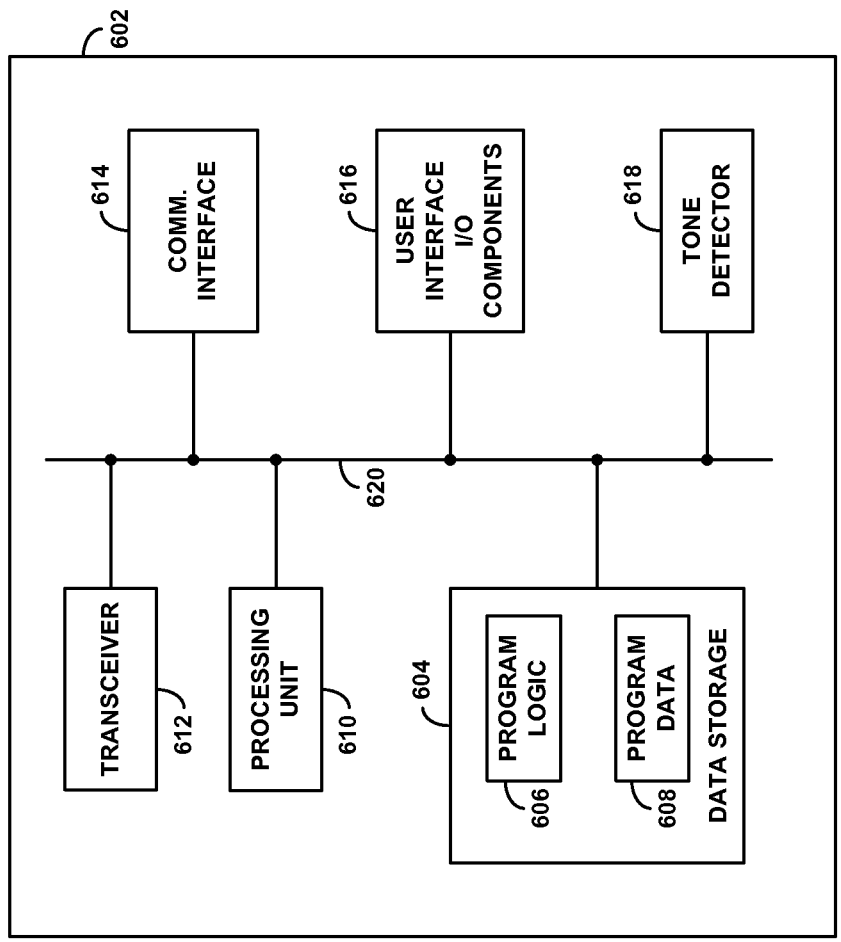
FIG. 6 is a block diagram of an example access terminal in which dynamic adjustment of reverse-link rate-control parameters may be implemented.

FIG. 6 is a simplified block diagram depicting functional components of an example access terminal 602 in which client-side operation of dynamic adjustment of reverse-link rate-control parameters may be implemented. The example AT 602 could be a cell phone, a personal digital assistant (PDA), a pager, a wired or wirelessly-equipped notebook computer, or any other sort of device. As shown in FIG. 6, the example AT 602 includes data storage 604, processing unit 610, transceiver 612, communication interface 614, user-interface I/O components 616, and tone detector 618, all of which may be coupled together by a system bus 620 or other mechanism.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein. Certain aspects of AT 602 relevant to synchronized determination of rate control are discussed briefly below.

Communication interface 614 in combination with transceiver 612, which may include one or more antennas, enables communication with the network, including reception of reverse-noise messages (e.g., RAB broadcasts) and parameter-adjustment messaged from the serving base station, as well as support for other forward and reverse link channels. The communication interface may include a module, such as an MSM™-series chipset made by Qualcomm Inc. of San Diego, Calif., and supports wireless packet-data communications according to a CDMA family of protocols.

Processing unit 610 comprises one or more general-purpose processors (e.g., INTEL microprocessors) and/or one or more special-purpose processors (e.g., dedicated digital signal processor, application specific integrated circuit, etc.). In turn, the data storage 604 comprises one or more volatile and/or non-volatile storage components, such as magnetic or optical memory or disk storage. Data storage 604 can be integrated in whole or in part with processing unit 610, as cache memory or registers for instance. In example AT 602, as shown, data storage 604 is configured to hold both program logic 606 and program data 608.

Program logic 606 may comprise machine language instructions that define routines executable by processing unit 610 to carry out various functions described herein. In particular the program logic, communication interface, and transceiver may operate cooperatively to carry out logical operation such as that discussed above and illustrated in FIG. 4.

It will be appreciated that there can be numerous specific implementations of an access terminal, such as AT 602, in which the client-side method of dynamic adjustment of reverse-link rate-control parameters could be implemented. Further, one of skill in the art would understand how to devise and build such an implementation. As such, AT 602 is representative of means for carrying out the client-side method of dynamic adjustment of reverse-link rate-control parameters, in accordance with the methods and steps described herein by way of example.

d. Example Base Station

Figure 7:
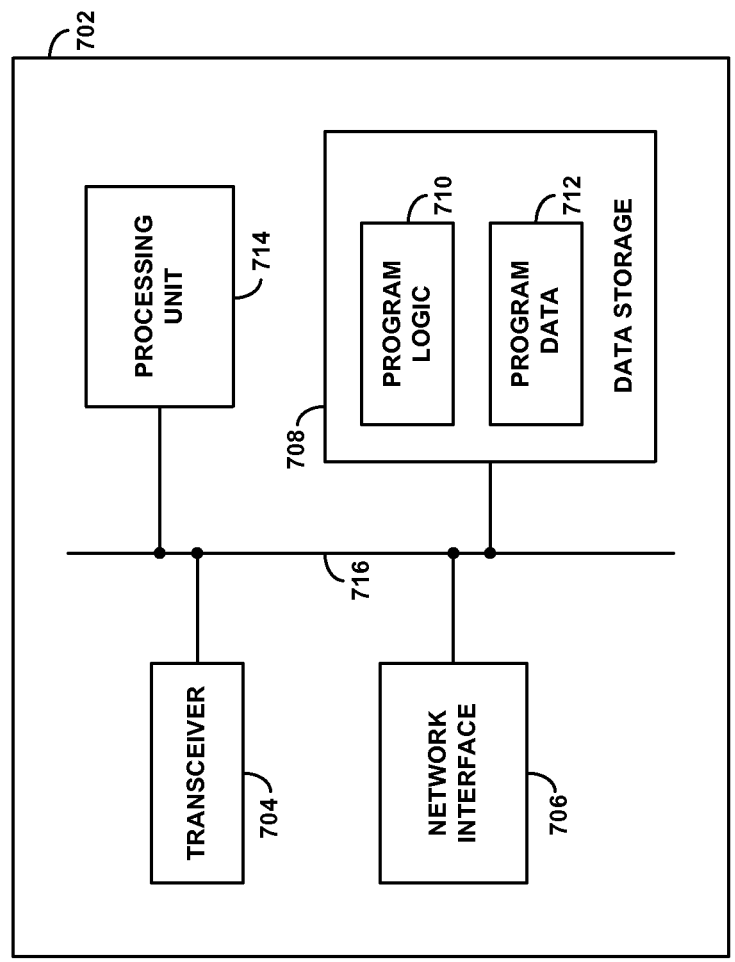
FIG. 7 is a block diagram of an example base station in which dynamic adjustment of reverse-link rate-control parameters may be implemented.

FIG. 7 is a simplified block diagram depicting functional components of an example base station 702 in which system-side operation of dynamic adjustment of reverse-link rate-control parameters may be implemented. As shown in FIG. 7, the example base station 702, representative of BTS 204 or BSC 206 integrated with BTS 204 in FIG. 2, for instance, includes a transceiver 704, network interface 706, a processing unit 714, and data storage 708, all of which may be coupled together by a system bus 716 or other mechanism. In addition, the base station may also include external storage, such as magnetic or optical disk storage, although this is not shown in FIG. 7.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein. Certain aspects of base station 702 relevant to dynamic adaptation of synchronized determination of rate control are discussed briefly below.

Network interface 706 enables communication on a network, such network 200. As such, network interface 706 may take the form of trunk or optical link that can be coupled with a TDM switch such as MSC 208, or an Ethernet network interface card or other physical connection that can be coupled with PCF 214, for instance. Further, network interface 706 in combination with transceiver 704, which may include one or more BTS antennas, enables air interface communication with one or more access terminals, supporting forward-link transmissions of protocol version messages, among other message and commands, and supporting reception reverse-link traffic on reverse links.

Processing unit 714 comprises one or more general-purpose processors (e.g., INTEL microprocessors) and/or one or more special-purpose processors (e.g., dedicated digital signal processor, application specific integrated circuit, etc.). In turn, the data storage 708 comprises one or more volatile and/or non-volatile storage components, such as magnetic or optical memory or disk storage. Data storage 708 can be integrated in whole or in part with processing unit 714, as cache memory or registers for instance. As further shown, data storage 708 is equipped to hold program logic 710 and program data 712.

Program logic 710 may comprise machine language instructions that define routines executable by processing unit 714 to carry out various functions described herein. In particular the program logic, communication interface, and transceiver may operate cooperatively to carry out logical operation such as that discussed above and illustrated in FIG. 5.

It will be appreciated that there can be numerous specific implementations of a base station (or BTS or other RAN element), such as base station 702, in which the system-side method of dynamic adjustment of reverse-link rate-control parameters could be implemented. Further, one of skill in the art would understand how to devise and build such an implementation. As such, base station 702 is representative of means for carrying out the system-side method of dynamic adjustment of reverse-link rate-control parameters, in accordance with the methods and steps described herein by way of example.

5. Conclusion

An example embodiment of the present invention has been described above. Those skilled in the art will understand, however, that changes and modifications may be made to this embodiment without departing from the true scope and spirit of the invention, which is defined by the claims.

What is claimed:

1. In an access terminal configured to operate in a wireless communication system that includes a base station, a method comprising:

operating in a state in which at least: the access terminal responds to receiving reverse-noise messages from the base station by (i) transmitting data on a reverse-link traffic channel to the base station at a data transmission rate based at least on the received reverse-noise messages and on a level of a resource in reserve for consumption in data transmission, and (ii) when the received reverse-noise messages indicate that conditions for increasing the data transmission rate are satisfied, replenishing the resource by an allocation size specified by at least one parameter;

while operating in the state, receiving a parameter-adjustment message from the base station, wherein the parameter-adjustment message includes an increased allocation size specified by at least one updated parameter; and in response to receiving the parameter-adjustment message and while still operating in the state, increasing the allocation size by replacing the at least one parameter with the at least one updated parameter in the parameter-adjustment message, thereby increasing how rapidly the data transmission rate increases.

2. The method of claim 1, wherein the access terminal is further configured to operate according to a CDMA family of protocols including at least IS-856, Rev. A, wherein the base station comprises a BTS and a coverage area, the coverage area being at least one of a cell and a sector, wherein the reverse-noise messages each comprise a reverse activity bit (RAB) for the coverage area, and wherein transmitting data on the reverse-link traffic channel to the base station at a data transmission rate based at least on the received reverse-noise messages and on the level of a resource in reserve for consumption in data transmission comprises transmitting data on the reverse-link traffic channel at a data transmission rate based at least on received RABs and determined in accordance with IS-856, Rev. A.

3. The method of claim 2, wherein the resource in reserve for consumption in data transmission is traffic-to-pilot (T2P) power, and the level of the resource in reserve is a level of available T2P, wherein the allocation size is an amount of T2P by which to change the level of available T2P, wherein the at least one parameter is one of a plurality of parameters, each parameter of the plurality specifying a particular positive value of allocation size, and wherein increasing the allocation size by replacing the at least one parameter with the at least one updated parameter in the parameter-adjustment message comprises increasing the particular positive value of allocation to a size specified by at least one of the plurality of parameters.

4. The method of claim 3, wherein the plurality of parameters comprises a first set of T2P-increment values, and wherein increasing the particular positive value of allocation to a size specified by the at least one of the plurality of parameters comprises replacing the first set of T2P-increment values with a second, corresponding set of T2P-increment values containing at least one positive value of allocation size that is larger than a corresponding particular positive value of allocation size specified in the first set of T2P-increment values.

5. The method of claim 1, wherein receiving the parameter-adjustment message from the base station comprises receiving an indication from the base station that a threshold number of access terminals are operating under radio-frequency (RF) conditions that exceed a threshold quality level.

6. The method of claim 1, wherein receiving the parameter-adjustment message from the base station comprises receiving an updated version of the at least one parameter that specifies an increased allocation size, and wherein increasing the allocation size by replacing the at least one parameter with the at least one updated parameter in the parameter-adjustment message comprises setting the allocation size to the increased allocation size specified in the received updated version of the at least one parameter.

7. In a base station configured to operate as part of a wireless communication system, a method comprising:

while serving each of a plurality of access terminals in a respective active communication session, making a determination that a threshold number of the plurality of access terminals are each measuring a signal-to-noise ratio (SNR) that exceeds a threshold SNR level; and in response to the determination, transmitting to each particular access terminal that is one of the threshold number a parameter-adjustment message instructing the particular access terminal to increase a rate of replenishing a resource reserve that is drawn upon when reverse-noise messages broadcast by the base station indicate that conditions for increasing the reverse-link data transmission rate are satisfied, thereby causing an increase in an amount by which the reverse-link data transmission rate increases, wherein each of the plurality of access terminals transmits data to the base station on a respective reverse-link traffic channel.

8. The method of claim 7, wherein the base station and each of the plurality of access terminals is configured to operated according to a CDMA family of protocols including at least IS-856, and wherein determining that the threshold number of the plurality of access terminals are each measuring a SNR that exceeds a threshold SNR level comprises:

receiving a respective data rate control (DRC) message from each of the threshold number of the plurality of access terminals; and translating each respective DRC message to a SNR level that exceeds the threshold SNR level.

9. The method of claim 7, wherein the base station and each of the plurality of access terminals is configured to operated according to a CDMA family of protocols including at least IS-856, Rev. A, wherein the base station comprises a BTS and a coverage area, the coverage area being at least one of a cell and a sector, wherein the reverse-noise messages each comprise a reverse activity bit (RAB) for the coverage area, wherein the base station broadcasts RABs to facilitate determination according to IS-856, Rev. A by each of the plurality of access terminals of a respective reverse-link data transmission rate based at least on a level of traffic-to-pilot (T2P) resource in reserve for consumption in data transmission, and wherein instructing the particular access terminal to increase the rate of replenishing the resource reserve comprises causing the particular access terminal to replace at least one current value of T2P-increment specifying an allocation size for replenishing the T2P resource with an updated, larger value of T2P-increment.

10. The method of claim 9, wherein the parameter-adjustment message includes the updated, larger value of T2P-increment.

11. An access terminal configured to operate in a wireless communication system that includes a base station, the access terminal comprising:

means for operating in a state in which at least: the access terminal responds to receiving reverse-noise messages from the base station by (i) transmitting data on a reverse-link traffic channel to the base station at a data transmission rate based at least on the received reverse-noise messages and on a level of a resource in reserve for consumption in data transmission, and (ii) when the received reverse-noise messages indicate that conditions for increasing the data transmission rate are satisfied, replenishing the resource by an allocation size specified by at least one parameter;

means for receiving a parameter-adjustment message from the base station while operating in the state, wherein the parameter-adjustment message includes an increased allocation size specified by at least one updated parameter; and means for responding to receiving the parameter-adjustment message while still operating in the state by increasing the allocation size by replacing the at least one parameter with the at least one updated parameter in the parameter-adjustment message, thereby increasing how rapidly the data transmission rate increases.

12. The access terminal of claim 11, wherein the access terminal is further configured to operate according to a CDMA family of protocols including at least IS-856, Rev. A, wherein the base station comprises a BTS and a coverage area, the coverage area being at least one of a cell and a sector, wherein the reverse-noise messages each comprise a reverse activity bit (RAB) for the coverage area, and wherein transmitting data on the reverse-link traffic channel to the base station at a data transmission rate based at least on the received reverse-noise messages and on the level of a resource in reserve for consumption in data transmission comprises transmitting data on the reverse-link traffic channel at a data transmission rate based at least on received RABs and determined in accordance with IS-856, Rev. A.

13. The access terminal of claim 12, wherein the resource in reserve for consumption in data transmission is traffic-to-pilot (T2P) power, and the level of the resource in reserve is a level of available T2P, wherein the allocation size is an amount of T2P by which to change the level of available T2P, wherein the at least one parameter is one of a plurality of parameters, each parameter of the plurality specifying a particular positive value of allocation size, and wherein increasing the allocation size by replacing the at least one parameter with the at least one updated parameter in the parameter-adjustment message comprises increasing the particular positive value of allocation to a size specified by at least one of the plurality of parameters.

14. The access terminal of claim 13, wherein the plurality of parameters comprises a first set of T2P-increment values, and wherein increasing the particular positive value of allocation to a size specified by the at least one of the plurality of parameters comprises replacing the first set of T2P-increment values with a second, corresponding set of T2P-increment values containing at least one positive value of allocation size that is larger than a corresponding particular positive value of allocation size specified in the first set of T2P-increment values.

15. The access terminal of claim 11, wherein receiving the parameter-adjustment message from the base station comprises receiving an indication from the base station that a threshold number of access terminals are operating under radio-frequency (RF) conditions that exceed a threshold quality level.

16. The access terminal of claim 11, wherein receiving the parameter-adjustment message from the base station comprises receiving an updated version of the at least one parameter that specifies an increased allocation size, and wherein increasing the allocation size by replacing the at least one parameter with the at least one updated parameter in the parameter-adjustment message comprises setting the allocation size to the increased allocation size specified in the received updated version of the at least one parameter.

17. A base station configured to operate as part of a wireless communication system, the base station comprising:

means for serving each of a plurality of access terminals in a respective active communication session, and while serving each of the plurality, making a determination that a threshold number of the plurality of access terminals are each measuring a signal-to-noise ratio (SNR) that exceeds a threshold SNR level; and means for responding to the determination by transmitting to each particular access terminal that is one of the threshold number a parameter-adjustment message instructing the particular access terminal to increase a rate of replenishing a resource reserve that is drawn upon when reverse-noise messages broadcast by the base station indicate that conditions for increasing the reverse-link data transmission rate are satisfied, thereby causing an increase in an amount by which the reverse-link data transmission rate increases, wherein each of the plurality of access terminals transmits data to the base station on a respective reverse-link traffic channel.

18. The base station of claim 17, wherein the base station and each of the plurality of access terminals is configured to operated according to a CDMA family of protocols including at least IS-856, and wherein determining that the threshold number of the plurality of access terminals are each measuring a SNR that exceeds a threshold SNR level comprises:

receiving a respective data rate control (DRC) message from each of the threshold number of the plurality of access terminals; and translating each respective DRC message to a SNR level that exceeds the threshold SNR level.

19. The base station of claim 17, wherein the base station and each of the plurality of access terminals is configured to operated according to a CDMA family of protocols including at least IS-856, Rev. A, wherein the base station comprises a BTS and a coverage area, the coverage area being at least one of a cell and a sector, wherein the reverse-noise messages each comprise a reverse activity bit (RAB) for the coverage area, wherein the base station broadcasts RABs to facilitate determination according to IS-856, Rev. A by each of the plurality of access terminals of a respective reverse-link data transmission rate based at least on a level of traffic-to-pilot (T2P) resource in reserve for consumption in data transmission, and wherein instructing the particular access terminal to increase the rate of replenishing the resource reserve comprises causing the particular access terminal to replace at least one current value of T2P-increment specifying an allocation size for replenishing the T2P resource with an updated, larger value of T2P-increment.

20. The base station of claim 19, wherein the parameter-adjustment message includes the updated, larger value of T2P-increment.

* * * * *